United States Patent [19]

Angel et al.

[11] 4,299,807
[45] Nov. 10, 1981

[54] METHODS OF PRODUCING KAOLIN PIGMENTS

[75] Inventors: Brian R. Angel, Westfield; Robert W. Bradshaw, Bricktown, both of N.J.

[73] Assignee: Yara Engineering Corporation, Elizabeth, N.J.

[21] Appl. No.: 156,027

[22] Filed: Jun. 3, 1980

Related U.S. Application Data

[63] Continuation of Ser. No. 897,177, Apr. 17, 1978, abandoned.

[51] Int. Cl.³ .................. C01B 33/26; C04B 33/04
[52] U.S. Cl. .......................... 423/327; 106/288 B; 501/150; 423/264; 423/328
[58] Field of Search .................. 423/328, 327, 264; 106/72, 288 B

[56] References Cited

U.S. PATENT DOCUMENTS

| | | | |
|---|---|---|---|
| 2,339,595 | 1/1944 | Williams et al. | 106/72 X |
| 2,920,832 | 1/1960 | Duke | 106/288 B |
| 3,021,195 | 2/1962 | Podschus et al. | 423/328 |
| 3,343,973 | 9/1967 | Billue | 106/72 X |
| 3,528,769 | 9/1970 | Lyons | 106/72 X |
| 3,853,983 | 12/1974 | Abercrombie et al. | 423/328 |
| 3,961,971 | 6/1976 | Abercrombie et al. | 106/72 |

FOREIGN PATENT DOCUMENTS

199127 11/1967 U.S.S.R.

*Primary Examiner*—Helen M. McCarthy
*Attorney, Agent, or Firm*—Buell, Blenko, Ziesenheim & Beck

[57] ABSTRACT

A method for producing kaolin pigments of improved coated brightness and opacity is provided in which kaolin is degritted, heated to the level of substantially minimum brightness and then leached. The kaolin may be comminuted before treatment, after heating or after leaching to control particle size distribution.

8 Claims, No Drawings

METHODS OF PRODUCING KAOLIN PIGMENTS

This is a continuation of application Ser. No. 897,177, filed Apr. 17, 1978, now abandoned.

This invention relates to methods of producing kaolin pigments and particularly to a method of producing high brightness kaolin pigments by a combination of heating followed by chemical leaching either with or without subsequent particle size reduction.

The vast majority of applications for kaolin pigments require that the kaolin material, after being removed from its natural environment, be subject to a series of physical and chemical treatments to impart desired qualities of whiteness, brightness, gloss, opacity, etc. to the end product. In general, color and particle size distribution are the two main parameters which determine the processing methods and applications of a kaolin to a particular use.

Kaolins are often fractionated into discrete size ranges and leached by chemical means to make them whiter and brighter. Typical of the prior art practices are those described in Maloney U.S. Pat. No. 2,158,987. That patent taught that the natural kaolin particles finer than about 2 microns equivalent spherical diameter (e.s.d.) produced paper coatings much superior in gloss, opacity and general utility than did kaolins containing sizeable proportions of particles coarser than this. This early patent revolutionized the kaolin pigment industry. Unfortunately, there is but a very small proportion of naturally occurring kaolin below 2 microns e.s.d. and so a very large percentage of natural kaolin had to be discarded. This led to methods of reducing the particle size of kaolin by comminution as in Lyons U.S. Pat. No. 2,904,267. In addition to the particle size problem, the kaolin deposits in the United States are basically of the secondary or sedimentary type and are discolored with iron, titanium and other metal salts which reduce their whiteness and brightness. Leaching with chemical leaching agents has been practiced in an effort to overcome this problem of discoloration.

All of these fractionation, comminution, bleaching, etc., steps are expensive and even with them a sizeable proportion of kaolin must be discarded as unsatisfactory or unusable.

Calcination of kaolin to be used for various purposes is another old and well-known practice in the kaolin art. It is known that heating kaolin at low temperature (500° C.–600° C.) will reduce its brightness but that calcination at increased temperatures up to about 1200° C. will increase its brightness. It is also well known that no additional increase in brightness can be obtained by chemical leaching following calcination at 1200° C. It is accordingly common practice within the kaolin industry either to leach or calcine at kaolin to increase its brightness, but never to leach the material after calcination.

Applicants have found that when kaolin is heated sufficiently to reduce its brightness to near minimum, in the range about 200° C. to 800° C. it can then be leached by conventional leaching techniques to restore its brightness to substantially the same level it would have reached by leaching prior to heating. We have, however, found that heating prior to leaching causes aggregation of particles, making it possible by our technique to modify both brightness and particle size and to obtain much higher yields of desired brightness and particle size distribution. Thus, the kaolin may be comminuted or not, and if comminuted then either before or after heating and leaching depending upon the raw clay and the final distribution desired. Our process may be, and preferably is, applied directly to the raw clay with only grit (about 5%–10% of the mined clay) removed. Consequently the yield of final pigment from raw clay is of the order of 90%.

The most significant departure from the prior art which is involved in this invention is the application of a leach after heating the clay.

The significance of this invention and its effect on kaolin can be best understood from the following examples illustrating the practice of this invention.

EXAMPLE 1

A crude kaolin from the Georgia Fall Line area was separated into three portions. One portion was fractionated according to conventional practices to remove coarse particles above 2 microns e.s.d. to provide a material having 80% below 2 microns e.s.d. The second portion was degritted, ground to 80% below 2 microns e.s.d. and leached with sodium dithionate at 7 lbs/ton of kaolin. The third portion was degritted, heated to 600° C. for 1 hour, ground to 80% below 2 microns e.s.d. and leached with sodium dithionate at 7 lbs./ton of kaolin. Each of the resulting products was applied to a paper sheet to form a coated sheet and the brightness and opacity of the coated sheet determined. The results appear in Table I.

TABLE I

| Example 1 | Brightness of Coated Sheet | Opacity of Coated Sheet |
| --- | --- | --- |
| CONTROL Crude Clay 1 Fractionated Clay 80% <2 μ, Leached | 74.4 | 89.20 |
| Non Fractionated Clay Ground to 80% <2 μ and Leached | 75.7 | 89.00 |
| Non Fractionated Clay Ground to 80% <2 μ, Heated at 600° C. for 1 Hour and Leached | 76.9 | 90.40 |

EXAMPLE 2

A crude kaolin from the Georgia Fall Line area was divided into seven portions. One portion was fractionated according to conventional practices to remove coarse particles and leave a fraction containing about 80% below 2 microns e.s.d. Portion two was degritted, ground to 80% below 2 microns e.s.d. and leached with sodium dithionate at the rate of 7 lbs/ton of kaolin. The third portion was treated the same as portion two but heated to 500° C. for 1 hour between grinding and leaching. The fourth portion was treated the same as the third portion but heated to 600° C. The fifth portion was degritted, heated to 400° C. for 1 hour, ground to 80% below 2 microns e.s.d. and leached with sodium dithionate at the rate of 7 lbs/ton of kaolin. The sixth portion was treated the same as the fifth portion but heated to 500° C. The seventh portion was also treated the same as portion five but heated to 600° C. Each of the resulting products was applied to a paper sheet as in Example I to form a coated sheet and the brightness and opacity of the coated sheet determined. The results appear in Table II.

TABLE II

| Example 2 | Brightness of Coated Sheet | Opacity of Coated Sheet |
| --- | --- | --- |
| CONTROL | | |
| Crude Clay 2 | | |
| Fractionated Clay 80% <2 μ, Leached | 73.1 | 88.5 |
| Non Fractionated Clay Ground to 80% <2 μ and Leached | 73.2 | 89.2 |
| Non Fractionated Clay Ground to 80% <2 μ, Heated at 500° C. for 1 Hour and Leached | 73.7 | 89.6 |
| Non Fractionated Clay Ground to 80% <2 μ, Heated at 600 ° C. for 1 Hour and Leached | 73.8 | 89.9 |
| Non Fractionated Clay Heated at 400° C. for 1 Hour Ground to 80% <2 μ and Leached | 72.8 | 89.2 |
| Non Fractionated Clay Heated at 500° C. for 1 Hour, Ground to 80% <2 μ and Leached | 73.2 | 89.3 |
| Non Fractioned Clay Heated at 600° C. for 1 Hour, Ground to 80% <2 μ and Leached | 74.1 | 89.6 |

While we have used sodium dithionate as the leaching agent, any of the conventional and well known leaching agents may be used. In each of the foregoing examples, grinding was carried out using an attrition grinder having a fine hard media and the leaching was carried out at a pH between 3 and 4.

It can be seen from the foregoing examples that the practice of this invention does effect a substantial improvement in coating brightness and opacity and, what is of very great importance, the improvement is not just on a small select fraction but on the entire clay mass.

In the foregoing specification, we have set out certain preferred practices and embodiments of our invention, however, it will be understood that this invention may be otherwise embodied within the scope of the following claims.

We claim:

1. A method of producing kaolin of improved brightness, opacity and particle size consisting essentially of the steps of:
   a. degritting a raw kaolin;
   b. heating said kaolin with only the grit removed following degritting to the temperature and for a time to produce substantially minimum brightness of said kaolin and aggregation of said kaolin;
   c. leaching said heated clay; and
   d. comminuting said aggregated clay following one of said heating and leaching steps.
2. A method as claimed in claim 1 wherein the kaolin is heated to a temperature in the range 200° C. to 800° C. prior to leaching.
3. A method as claimed in claim 1 wherein the kaolin is comminuted prior to heating and leaching.
4. A method as claimed in claim 1 wherein the kaolin is comminuted after heating and before leaching.
5. A method as claimed in claim 1 wherein the kaolin is comminuted after leaching.
6. A method as claimed in claim 3 wherein the kaolin is comminuted to substantially below 2 microns e.s.d.
7. A method as claimed in claim 4 wherein the kaolin is comminuted to substantially below 2 microns e.s.d.
8. A method as claimed in claim 5 wherein the kaolin is comminuted to substantially below 2 microns e.s.d.

* * * * *